UNITED STATES PATENT OFFICE.

JENS ANTON CHRISTIANSEN, OF COPENHAGEN, DENMARK.

METHOD OF PRODUCING METHYL ALCOHOL FROM ALKYL FORMATES.

1,302,011.　　　Specification of Letters Patent.　　Patented Apr. 29, 1919.

No Drawing.　　Application filed December 6, 1918.　Serial No. 265,635.

*To all whom it may concern:*

Be it known that I, JENS ANTON CHRISTIANSEN, a subject of the King of Denmark, residing at Copenhagen, Denmark, have invented new and useful Improvements in Methods of Producing Methyl Alcohol from Alkyl Formates; and I do hereby declare the following to be a full, clear, and exact description of the same.

The invention relates to a method of producing methyl alcohol from alkyl formates.

I have found that through treating an alkyl formate with hydrogen in the presence of an appropriate catalyzer it is possible to decompose the formate whereby methyl alcohol and the alcohol derived from the alkyl contained in the alkyl formate in question is formed. Thus, if R designs an alkyl the following reaction can be carried out in the manner stated:

$$H.COOR + 2H_2 = CH_3OH + ROH. \quad (1)$$

If the alkyl R happens to be methyl, the ester used thus being methyl formate it is understood that only methyl alcohol will be formed according to the reaction:

$$H.COOCH_3 + 2H_2 = 2CH_3OH. \quad (2)$$

As a catalyzer various substances may be used. Oxids of copper which have been more or less reduced into metallic copper have proved to be well suited for the purpose and the reaction can be effected at ordinary or at a higher pressure. If reduced copper is used as a catalyzer the process takes place very easily at a temperature of about 180° centigrade.

It is well known that alkyl formates can be formed synthetically from carbon monoxid and the alcohol in question through simple uniting of these substances in the presence of the sodium alcoholate of the alcohol in question. Thus the methyl formate can be produced by leading under a high pressure carbon monoxid and methyl alcohol together over solid sodium methylate containing some methyl alcohol or by leading carbon monoxid into a solution of sodium methylate in methyl alcohol.

The process takes place as follows:

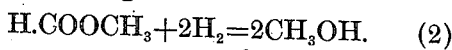
$$CO + CH_3OH = HCOOCH_3. \quad (3)$$

It is now possible to combine this latter process with that indicated by equation (2) either through treating with hydrogen of methyl formate already produced in accordance with equation (3) as stated in equation (2) or treating methyl alcohol produced in accordance with equation (2) with carbon monoxid whereby methyl formate is produced.

Through combining the processes according to equations (2) and (3) unlimited quantities of either methyl alcohol or methyl formate can be produced from the gases contained in so called water gas as the production of methyl formate just requires equal volumes of carbon monoxid and hydrogen while the production of methyl alcohol requires two volumes of hydrogen to one volume of carbon monoxid.

Having thus fully described my invention, I claim as new and desire to secure by Letters Patent in U. S. A.—

1. Method of producing methyl alcohol from an alkyl formate consisting in treating an alkyl formate with hydrogen in the presence of a catalyzer.

2. Method of producing methyl alcohol from an alkyl formate consisting in treating methyl formate with hydrogen in the presence of a catalyzer.

3. Method of producing methyl alcohol consisting in combining carbon monoxid and methyl alcohol into methyl formate in the presence of a catalyzer and treating the methyl formate formed with hydrogen in the presence of another catalyzer for the formation of methyl alcohol substantially as set forth.

In testimony whereof I have affixed my signature in presence of two witnesses.

JENS ANTON CHRISTIANSEN.

Witnesses:
　T. B. ALFORD,
　E. W. ETHSKOW.